(12) United States Patent
Martins et al.

(10) Patent No.: US 9,284,917 B2
(45) Date of Patent: Mar. 15, 2016

(54) GAS DISTRIBUTION MANIFOLD IN THE CYLINDER HEAD OF AN ENGINE, WITH THE RECIRCULATED EXHAUST GAS MIXTURE IN A COUNTER-FLOW TO THE ADMISSION GASES

(75) Inventors: Carlos Martins, Le Chesnay (FR);
Bertrand Gessier, Montfort l'amaury (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 743 days.

(21) Appl. No.: 13/638,198

(22) PCT Filed: Mar. 28, 2011

(86) PCT No.: PCT/EP2011/054751
§ 371 (c)(1),
(2), (4) Date: Nov. 28, 2012

(87) PCT Pub. No.: WO2011/120932
PCT Pub. Date: Oct. 6, 2011

(65) Prior Publication Data
US 2013/0081601 A1  Apr. 4, 2013

(30) Foreign Application Priority Data
Mar. 31, 2010 (FR) ...................... 10 52438

(51) Int. Cl.
*F02M 25/07* (2006.01)
*F02M 35/10* (2006.01)
*F02M 35/112* (2006.01)

(52) U.S. Cl.
CPC ....... *F02M 25/0703* (2013.01); *F02M 25/0722* (2013.01); *F02M 25/0723* (2013.01); *F02M 35/10222* (2013.01); *F02M 35/112* (2013.01); *Y02T 10/121* (2013.01)

(58) Field of Classification Search
CPC .................... F02M 25/0772; F02M 35/10222
USPC ..................................................... 123/568.17
See application file for complete search history.

(56) References Cited

U.S. PATENT DOCUMENTS 5,168,839 A * 12/1992 Hitomi et al. ............ 123/184.42
6,138,651 A * 10/2000 Mori et al. ............... 123/568.17
(Continued)

FOREIGN PATENT DOCUMENTS

DE  198 11 634 A1  9/1999
EP  1 059 435 A2  12/2000
EP  1 533 512 A2  5/2005
(Continued)

OTHER PUBLICATIONS

International Search Report w/translation from PCT/EP2011/054751 mailed on Apr. 29, 2011 (6 pages).

*Primary Examiner* — Hieu T Vo
*Assistant Examiner* — Arnold Castro
(74) *Attorney, Agent, or Firm* — Osha Liang LLP

(57) ABSTRACT

The invention relates to a gas distribution manifold (3) in the cylinder head (4) of a heat engine of a motor vehicle, said manifold (3) comprising a manifold housing (31) provided with an inflow face for the inflow of an admission gas (G) and an outflow face (3B) entering the cylinder head of the engine, in such a way as to enable the circulation of the admission gas flow in the downstream direction in the manifold housing (31); and means for injecting a recirculated exhaust gas flow (H) of the engine into the admission gas flow (G). Said injection means are formed in the manifold in such a way that the recirculated exhaust gas flow is injected in a counter-flow to the admission gas flow.

9 Claims, 2 Drawing Sheets

(56) References Cited

U.S. PATENT DOCUMENTS

| | | | |
|---|---|---|---|
| 7,207,324 B2* | 4/2007 | Kuhnel et al. | 123/568.12 |
| 8,584,656 B2* | 11/2013 | Marimbordes et al. | 123/568.12 |
| 2003/0136368 A1* | 7/2003 | Ausiello et al. | 123/184.21 |
| 2004/0079347 A1* | 4/2004 | Bender et al. | 123/568.17 |
| 2008/0264060 A1* | 10/2008 | Carlsson et al. | 60/605.2 |
| 2011/0041817 A1* | 2/2011 | Guerry et al. | 123/568.17 |
| 2011/0192383 A1* | 8/2011 | Morais | 123/568.17 |

FOREIGN PATENT DOCUMENTS

| | | |
|---|---|---|
| GB | 2 386 158 A | 9/2003 |
| WO | 97 34081 A1 | 9/1997 |
| WO | 2008/070895 A1 | 6/2008 |
| WO | 2008/116568 A1 | 10/2008 |

* cited by examiner

GAS DISTRIBUTION MANIFOLD IN THE CYLINDER HEAD OF AN ENGINE, WITH THE RECIRCULATED EXHAUST GAS MIXTURE IN A COUNTER-FLOW TO THE ADMISSION GASES

BACKGROUND OF THE INVENTION

The invention relates to the field of heat exchangers and, more particularly, the heat exchangers used in the motor vehicle domain.

A heat engine of a motor vehicle comprises a combustion chamber, generally formed by a plurality of cylinders, in which a mixture of oxidant and fuel is burned to generate the work of the engine. The gases taken into the combustion chamber are called intake gases.

In some cases, these intake gases have to be cooled before being introduced into the combustion chamber; this function is fulfilled by a heat exchanger, which is a cooler.

Conventionally, a heat exchanger comprises a heat exchange bundle formed by a plurality of exchange elements stacked between two end plates (bottom plate and top plate). The spaces between the exchange elements of the bundle form ducts for a flow of gas to be cooled, here intake gases. The exchange elements of the bundle are hollow and conduct a heat transfer fluid, intended to exchange heat with the flow of gas to be cooled circulating in the fluid ducts and thus cool it.

In order to reduce the polluting emissions, it is known practice to introduce, into the flow of intake gas, so-called "recirculated" exhaust gases. These are exhaust gases taken downstream of the combustion chamber in order to be rerouted (recirculated) to the flow of intake gas, upstream of the combustion chamber, where they are mixed with the intake gases prior to their intake into the combustion chamber. Traditionally, the recirculated exhaust gases are introduced via one or more introduction points formed in an intake duct for the gases extending between the cooler of the intake gases and the engine, in order for the recirculated exhaust gases to be mixed with the gases originating from the cooler.

A current trend aims to bring the heat exchanger as close as possible to the engine in order to gain in compactness.

The patent application published under the number WO2008/116568 teaches a heat exchange module intended to be mounted on the cylinders of an internal combustion engine. With reference to FIGS. 1 and 2 representing the module of the application WO2008/116568, the heat exchange module comprises, in its upstream part 110, a heat exchange bundle 111, and in its downstream part 103, output ducts 106 arranged to be connected respectively to the cylinders of the engine.

During its operation, a flow of intake gas G is introduced via an upstream face of the exchange module to be cooled by the heat exchange bundle 111, the cooled flow then being distributed in the output ducts of the exchange module to be taken into the cylinders of the engine to which the ducts 106 are respectively connected.

Each output duct 106 of the heat exchange module, in which the flow of cooled intake gas G circulates, comprises an injection orifice 107 for a flow of recirculated exhaust gases H, which is injected by an injection duct 105 connected to the output duct 106 of the exchange module at the level of said injection orifice 107, as represented in FIG. 2. Thus, the flow of intake gas G and the flow of recirculated exhaust gases H are mixed in the output ducts 106 of the module before their intake into the cylinders of the engine.

As represented in FIG. 2, the recirculated exhaust gases are injected in a direction orthogonal to the direction of the flow of intake gas which requires the injection ducts 105 to be added onto the exchange module which increases its volume.

Moreover, in order to allow for a uniform mixing between the two gas flows, it is necessary for the mixing module to have a sufficient length downstream of the place of injection. For a compact exchange module, an injection of the flow of exhaust gas orthogonally to the flow of intake gas makes it difficult to create sufficient entropy for the homogenization of the mixture.

BRIEF SUMMARY OF THE INVENTION

In order to eliminate at least some of these drawbacks, the invention relates to a gas distribution manifold in the cylinder head of a heat engine of a motor vehicle, the manifold comprising a manifold housing comprising an input face for a flow of intake gas and an output face intended to open into the cylinder head of the engine, so as to allow a circulation of a flow of intake gas from upstream to downstream in the manifold housing; and means for injecting a flow of recirculated exhaust gases from the engine into the flow of intake gas, a manifold in which the injection means are configured so that the flow of recirculated exhaust gases is injected counter-current to the flow of intake gas.

By virtue of the invention, the flow of recirculated exhaust gases is injected counter-current to the flow of intake gas which makes it possible to create a strong entropy in the mixing area and thus promotes the formation of turbulences allowing for the homogenization of the two gases. Moreover, the quality of the mixing of the two gas flows does not depend only on the volume of the manifold situated downstream of the place of injection of the recirculated exhaust gases. In fact, since the flow of recirculated exhaust gases moves counter-current, that is to say in the upstream direction, a portion of the volume of the manifold situated upstream of the place of injection makes it possible to participate in the mixing of the two gas flows.

Advantageously, a manifold with counter-current injection means can be compact and allow for a uniform mixing of the gases before their intake into the cylinder head.

Preferably, the injection means define a plurality of injection orifices oriented in the upstream direction. Advantageously, the flow of recirculated exhaust gases is divided up by said injection orifices into a plurality of individual flows of recirculated exhaust gases circulating counter-current which promotes the mixing of the two gas flows.

According to one aspect of the invention, the direction of injection of the flow of recirculated exhaust gases and the direction of circulation of the flow of intake gas form an injection angle, the injection angle is less than 30°. An injection angle advantageously allows for a counter-current injection, promoting the turbulences, while making it possible not to have the injection means directly in the flow of the intake gases, the injection means advantageously being able to be arranged at the periphery of the manifold.

Preferably, the injection means are formed at the downstream end of the manifold. Thus, the volume of the distribution manifold situated upstream of the place of injection is exploited to homogenize the two gas flows. An orthogonal injection of a flow of recirculated exhaust gases at the downstream end of the manifold would risk not making it possible to obtain a uniform mixing.

According to one aspect of the invention, the manifold housing having a rectangular section for passage of the flow of intake gas, the injection means open onto at least one length of the manifold housing.

According to a variant, the injection means open onto at least two adjacent sides of the manifold housing. A peripheral injection advantageously makes it possible to increase the area of mixing of the two gas flows.

Preferably, the injection means are formed in the manifold housing. By incorporating the injection means in the manifold housing, the manifold obtained can advantageously have smaller dimensions.

According to a variant, the manifold housing comprising walls for guiding the intake flow, the injection means are formed at a distance from said walls.

The invention also relates to a device for mixing a flow of intake gas and a flow of recirculated exhaust gases for their intake into the cylinder head of a heat engine of a motor vehicle, the device comprising a heat exchanger comprising a gas cooling heat exchange bundle and a gas distribution manifold in the cylinder head as presented previously.

BRIEF DESCRIPTION OF THE DRAWINGS

The invention will be better understood using the following description of one embodiment of the device of the invention, with reference to the appended drawing, in which.

DETAILED DESCRIPTION OF THE INVENTION

Figure 1:
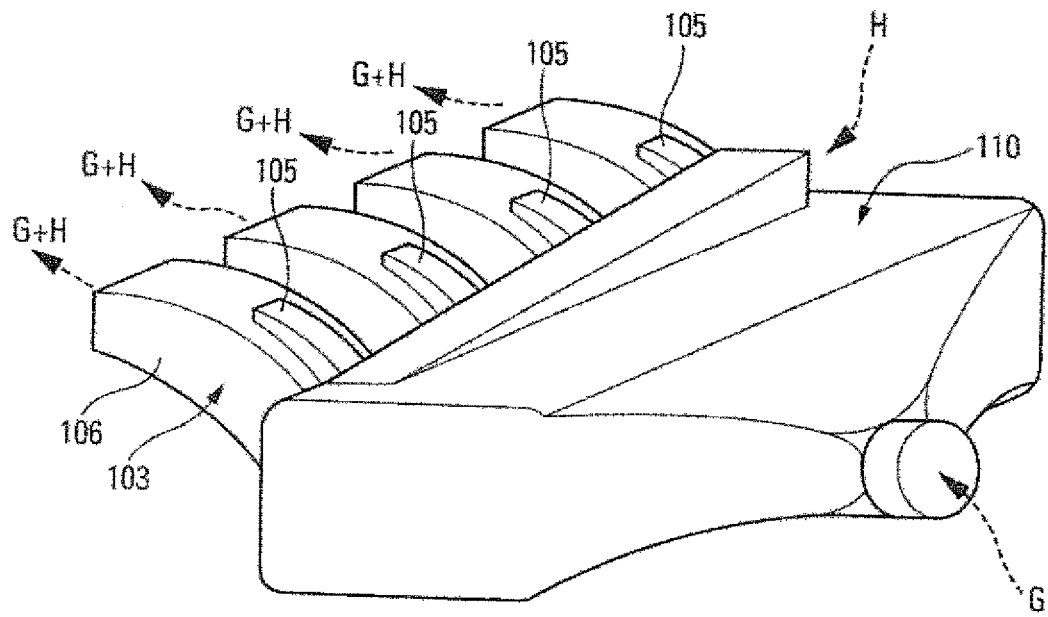
FIG. 1 represents a perspective view of a gas mixing device in an engine cylinder head according to the prior art (already discussed)
Figure 2:
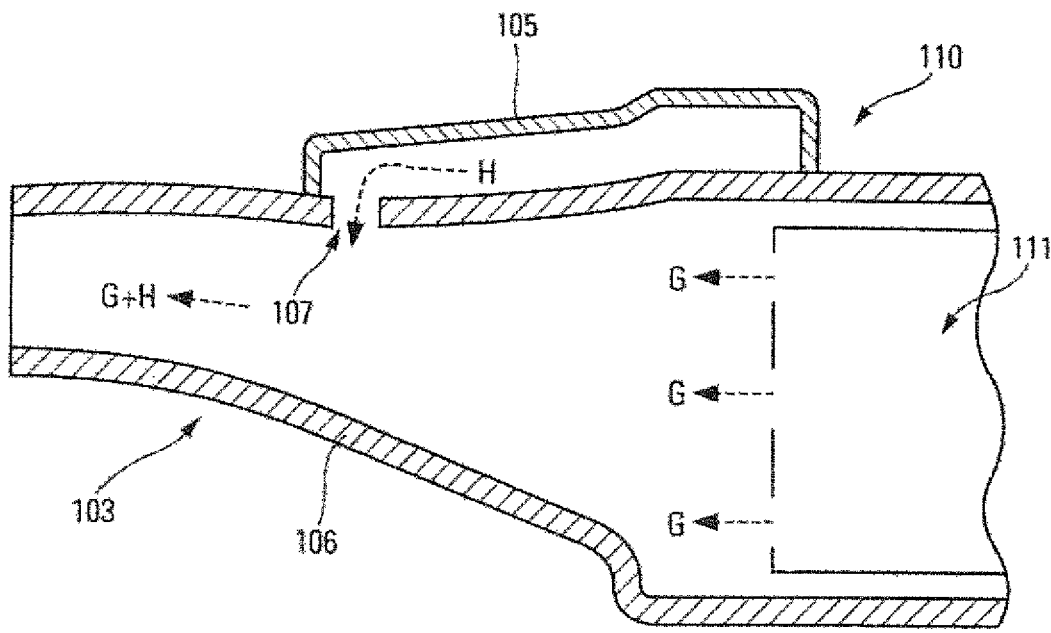
FIG. 2 represents a longitudinal cross-sectional view of the device of FIG. 1, the cross section being taken in the direction of circulation of the gases in the device (already discussed)
Figure 3:
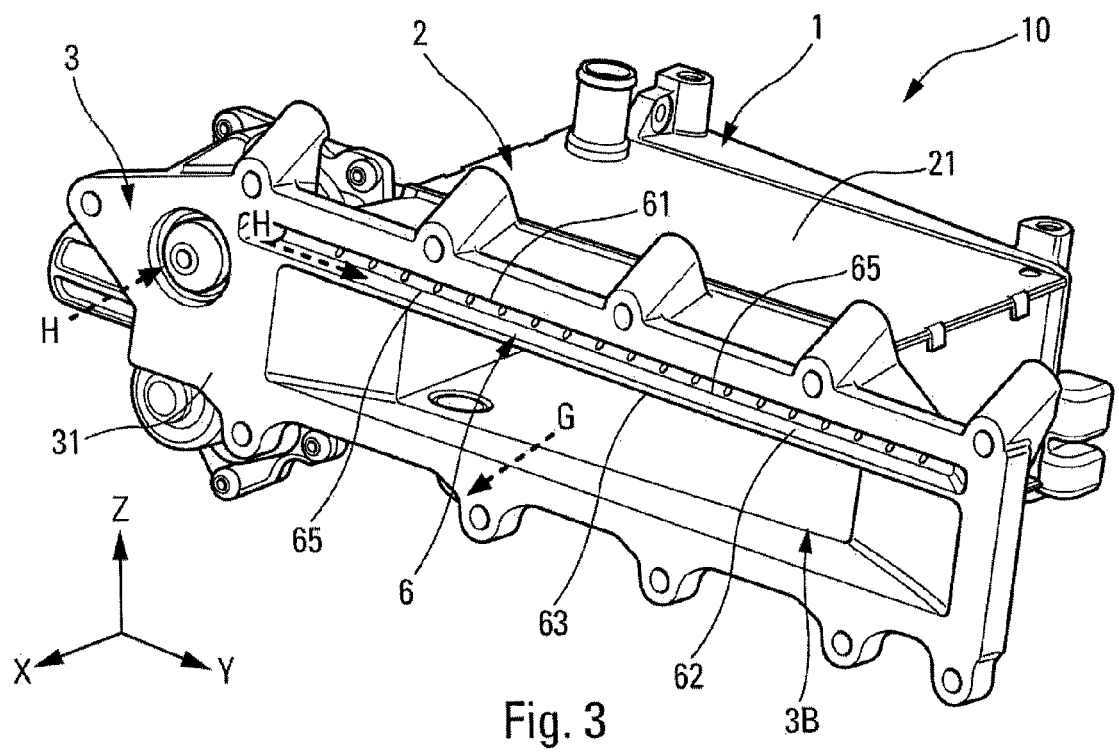
FIG. 3 represents a perspective view of the gas mixing device according to the invention comprising an input manifold, a heat exchanger, an output manifold and an intake valve for taking recirculated exhaust gases into the device, the device being seen substantially from the front, that is to say, the cylinder head side.

With reference to FIG. 3, a device 10 for mixing and distributing a flow of gas in the cylinder head of a heat engine of a motor vehicle (represented in FIG. 4) comprises a heat exchanger 2 comprising a heat exchange bundle (not shown) arranged to exchange heat with a first flow of gas (G), here, of the intake gases comprising air, circulating in the heat exchange bundle.

Hereinafter, the terms "upstream" and "downstream" are defined in relation to the direction of circulation of the flow of intake gas (G) in the mixing device 10, the intake gases (G) circulating from upstream to downstream in the device 10 in a direction X of circulation of the gases represented in FIG. 3.

The intake gases (G) are introduced into the heat exchanger 2 by an input manifold 1, mounted upstream of the heat exchanger 2, and exhausted via an output manifold 3, also called distribution manifold 3, mounted downstream of the heat exchanger 2 and intended to be linked to the cylinder head 4 of the engine. The distribution manifold 3 allows for a distributed intake, in the cylinder head 4, of the flow of cooled gas (G) from the heat exchanger 2.

The mixing device 10 also comprises a duct 8 for injecting a flow of recirculated exhaust gases from the engine (H) known to those skilled in the art by the English abbreviation "EGR", standing for "exhaust gas recirculation".

Figure 4:
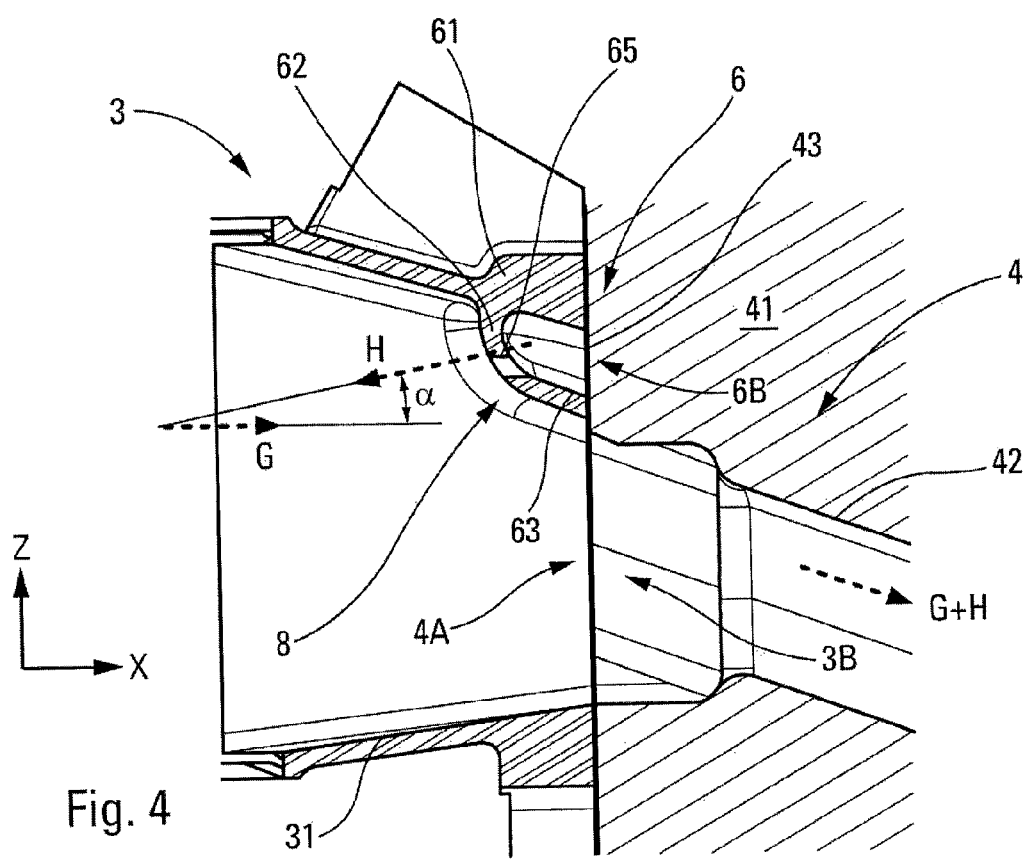
FIG. 4 represents a longitudinal cross-sectional view of the output manifold of the device of FIG. 3 linked to a cylinder head of an engine, the cross section being taken in the direction of circulation of the gases in the device.

With reference to FIG. 4, the injection duct 8 is formed between the output manifold 3 and the cylinder head 4 so as to inject the flow of recirculated exhaust gases (H) into the flow of intake gas (G) upstream of the cylinder head 4.

In order to clearly understand the invention, each element of the mixing device according to the invention will be described individually both in its structure and in its function.

Heat Exchanger

With reference to FIG. 3, the heat exchanger 2 comprises an exchanger housing 21 jacketing a heat exchange bundle comprising a plurality of stacked exchange elements (not represented). The spaces between the exchange elements of the bundle form ducts for the flow of gas to be cooled (G), here the intake gases. The exchange elements of the bundle are hollow and convey a heat transfer fluid, intended to exchange heat with the flow of gas to be cooled (G) circulating from upstream to downstream in the fluid ducts.

The heat exchange bundle takes the form of a parallelepiped extending lengthwise in the direction X of circulation of the gases and comprising an upstream input face through which the intake gases to be cooled (G) are introduced and a downstream output face through which the cooled intake gases (G) are exhausted.

Hereinafter, the terms "top", "bottom", "left" and "right" are defined in relation to the orientation of the mixing device 10 represented in perspective in FIG. 3 and in accordance with the orthogonal coordinate system of axes (X, Y, Z), the axis X being oriented from upstream to downstream and corresponding to the direction X of flow of the gases, the axis Y being oriented from left to right and the axis Z being oriented from bottom to top, that is to say from the bottom part of the device to its top part.

Input Manifold

The input manifold 1, represented in FIG. 3, makes it possible to guide and distribute the flow of gas to be cooled (G) over the total surface of the input face of the heat exchange bundle. To this end, the input manifold 1 is in the form of a housing that is roughly flared from upstream to downstream, the downstream end of which is linked to the upstream end of the exchanger housing 21. The input manifold 1 comprises an output face opening onto the input face of the heat exchanger 2, and an input orifice (not shown), for example situated laterally, that is to say, in a plane situated perpendicularly to its output face, through which the intake gases to be cooled (G) are introduced into the input manifold 1.

Distribution Manifold

With reference to FIGS. 3 and 4, the distribution manifold 3, also called output manifold 3, mounted downstream of the heat exchanger 2, comprises an intake gas (G) input face into which the output face of the heat exchange bundle of the exchanger 2 opens, and an output face 3B intended to be linked to the gas intake face of the cylinder head 4.

The output manifold 3 comprises a manifold housing 31 guiding the gases introduced from the input face of the output manifold 3 to the cylinder head of the engine 4 via the output face 3B.

As indicated previously, in this embodiment the tubular injection duct 8 of the mixing device 10 is arranged at the interface between the output manifold 3 and the cylinder head 4. The tubular injection duct 8 is formed from two distinct parts, a first part attached to the housing of the output manifold 31 and a second part attached to the cylinder head of the engine 4.

The part of the tubular injection duct 8 which is attached to the housing 31 of the output manifold 3 is in the form of a recirculated exhaust gas injection channel 6. The injection channel 6 is arranged to inject a flow of recirculated exhaust gases (H) into the flow of cooled gases (G) so that the two gas flows (G, H) are mixed. In this example, the injection channel 6 extends at the downstream end of the output manifold 3, inside the manifold housing 31, along the top wall of the manifold housing 31 as represented in FIG. 3. The injection channel 6 here extends rectilinearly from left to right in the entire length of the top wall of the manifold housing 31.

With reference to FIG. 4, the injection channel 6 is in the form of a half-shell and comprises an outer wall 61 extending in the direction X, a bottom wall 62 extending in the direction Y and an inner wall 63 extending in the direction X.

The outer wall 61 of the injection channel 6 is here formed by the wall of the manifold housing 31. The bottom 62 and inner 63 walls extend in the manifold housing 31, the inner wall 63 extending substantially parallel to the outer wall 61 and the bottom wall 62 linking said inner 63 and outer 61 walls. In other words, the injection channel 6 has a U-section, in which the open end of the U is oriented in the downstream direction.

The injection channel 6 comprises an open face 6B, corresponding to the open end of the U, which is configured to be closed by the cylinder head 4 so as to form a tubular injection duct 8.

With reference to FIG. 3, the injection duct 6 extends transversely to the direction X of circulation of the gases and comprises injection means formed in the injection channel 6 in order to inject the flow of recirculated exhaust gases (H) into the flow of cooled gases (G). The injection channel 6 is closed at its left end by a left wall extending substantially parallel to the plane (X, Z) which is pierced by an input orifice in order to connect the volume of the injection channel 6 with an inlet for recirculated exhaust gases (H), as explained below. The injection channel 6 is closed at its right end via a right wall extending substantially parallel to the plane (X, Z), defined in the right lateral wall of the manifold housing 31.

With reference to FIG. 3, the injection means are in the form of a plurality of injection orifices 65 which are formed in the manifold housing 31, for example, in the thickness of the interior walls of said housing 31. The flow of recirculated exhaust gases (H) moves in the injection channel in the direction Y from left to right to be divided, by the injection orifices 65, into a plurality of individual flows of recirculated exhaust gases which are injected into the volume of the manifold housing 31.

The injection orifices 65 are oriented in the upstream direction. In other words, the injection orifices 65 are oriented counter-current to the flow of intake gases (G) so as to form significant turbulences. This advantageously makes it possible to promote the shearing of the flow of cooled gases (G) by the flow of exhaust gases (H). In fact, since the relative speeds of the two flows are high, the homogenization of the mixing is favored.

Still with reference to FIG. 4, the direction of injection of the flow of recirculated exhaust gases (H) and the direction X of circulation of the flow of intake gas (G) form an injection angle α. To promote the formation of turbulences, the injection angle α is, preferably, less than 30°. Thus, the flow of recirculated exhaust gases (H) and the flow of intake gas (G) are mixed at high speed which increases the entropy. The homogeneity of the two gas flows is then improved.

An injection angle α between 20° and 30° advantageously makes it possible to form the injection orifices 65 at the periphery of the housing while allowing for an injection of the flow of recirculated exhaust gases toward the center of the manifold housing, that is to say toward the center of its section of passage of intake gas. When the injection angle α is small, that is to say less than 5°, the injection means 65 have to be arranged in the intake gas guiding housing which reduces the mixing volume of the manifold.

An injection angle α between 20° an 30° also makes it possible to avoid having the flow of recirculated exhaust gases stick to on the interior walls of the guiding housing which would prevent the formation of turbulences.

A plurality of injection orifices have been described here, but it goes without saying that the injection means could also take the form of a longitudinal slot oriented in the upstream direction, preferably with an injection angle α less than 30°.

It goes without saying that the injection angles of the injection orifices 65 could be different from one another. For example, the injection angle of the injection orifices could be dependent on the distance from said injection orifice to the manifold housing. Preferably, the injection angle of the injection orifices is inversely proportional to the distance from said orifice to the manifold housing.

Moreover, in order to even further increase the shearing effect, the opening of the injection means 65 of the injection channel 6 is formed in such a way as to allow an injection of the exhaust gases (H) at high speed. For a constant recirculated gas flow rate, the narrower the opening of the injection means, the higher the speed of injection of the recirculated gases (H). However, injection means 65 for which the opening is narrow is subject to clogging because of the heavy particles (soot, etc.) in suspension in the flow of exhaust gas (H). To this end, an opening between 3 mm and 7 mm wide, preferably equal to 5 mm, ensures a trade-off between a sufficient injection speed and a limiting of the risk of clogging. The width of the opening is determined within this range as a function of the nature of the exhaust gases (H). The more heavy particles there are in the exhaust gases (H)—the exhaust gases are said to be "charged"—the greater the width of the opening to limit the risk of clogging.

The injection means 65 are, in this example, formed in the manifold housing 31, preferably in the bottom wall 62 of the injection channel 6. The injection means 65 are here formed at a distance from the intake flow guiding walls of the manifold housing 31 so as to avoid an injection along said guiding walls. Such an injection would risk causing a laminar flow of exhaust gas in relation to the flow of intake gas and would prevent effective mixing.

As indicated previously, the injection duct 8 comprises a part attached to the cylinder head 4 arranged to close the open face 6B of the injection channel 6.

To allow for the intake of the recirculated exhaust gases (H) into the injection channel 6, the output manifold 3 comprises an intake input for a flow of recirculated exhaust gases (H) from the engine in order for the recirculated exhaust gases (H) to penetrate into the output manifold from the left hand extension part of the output manifold housing (the flow entering into the output manifold being represented by an arrow designated H) to be then guided, by a flow control valve or an automotive hose, in the injection channel 6 through the input orifice mentioned above (the flow entering into the injection channel being represented by an arrow designated H).

Engine Cylinder Head

With reference to FIG. 4, the cylinder head 4 of the engine comprises a cylinder head body 41 in which is formed an intake duct 42 arranged to conduct the gases from the output manifold 3 to the cylinders of the engine. The intake duct 42 has an input face 4A, the dimensions of which correspond to the output face 3B of the output manifold 3. In this example, the second part of the injection duct 8, which is attached to the cylinder head 4, is formed by a planar surface 43 of the cylinder head body 41.

With reference to FIG. 4, when assembling the output manifold 3 with the cylinder head 4, the injection channel 6, formed at the downstream end of the housing of the manifold 31, comes into contact with the planar surface 43 of the cylinder head body 41, the planar surface 43 of the cylinder head 4 closing the open face 6B of the injection channel 6 to form a tubular injection duct 8 formed upstream by the injection channel 6 and downstream by the planar surface 43 of the cylinder head body 41. The tubular duct 8 has a substantially U-shaped section.

The output manifold 3 and the cylinder head 4 are here attached to one another, for example, by mechanical means such as screwing or similar.

The invention has been described here with an injection duct 8 formed between the distribution manifold 3 and the cylinder head 4 of the engine. However, the tubular injection duct 8 can be formed between the distribution manifold 3 and the heat exchanger 2, or in the output manifold 3, by an additional wall thereof or by an added tubular element.

An implementation of the invention will now be presented with reference to FIG. 4.

Implementation

During the operation of the mixing device 10 according to the invention, a flow of intake gas to be cooled (G) is introduced through the input orifice of the input manifold 1 and circulates from upstream to downstream in the heat exchange bundle, in the direction X of circulation of the gases, to be cooled. The flow of cooled intake gases (G) then circulates in the output manifold 3.

The flow of recirculated exhaust gases (H) moves in the injection channel 6 in the direction Y from left to right to be divided into a plurality of individual flows of recirculated exhaust gases which are injected into the manifold housing 31.

At the output face 3B of the output manifold 3, the flow of cooled intake gases (G) is sheared by the flow of recirculated exhaust gases (H) injected in the reverse direction to that of the flow of cooled gases. The turbulences generated by the shearing in the area of confluence of the gases (H, G) favor the mixing of the flows of gas to form a homogeneous flow of gas which is taken into the cylinders of the engine via the cylinder head 4.

Thus, the device according to the invention makes it possible to obtain a homogeneous mixture of the gases taken into the cylinder head 4 of the engine while combining compactness, effectiveness and efficiency. Furthermore, the device can be mounted simply and quickly.

The invention claimed is:

1. A gas distribution manifold in a cylinder head of a heat engine of a motor vehicle, the manifold comprising:
    a manifold housing comprising an input face for a flow of intake gas and an output face intended to open into the cylinder head of the engine, so as to allow a circulation of the flow of intake gas from upstream to downstream in the manifold housing, the manifold housing further comprising a heat exchanger disposed between an input face and an output face such that the flow of intake gas flows across the heat exchanger between the input face and the output face, and
    means for injecting a flow of recirculated exhaust gases from the engine into the flow of intake gas,
    wherein the injection means are configured so that the flow of recirculated exhaust gases is injected counter-current to the flow of intake gas.

2. The manifold as claimed in claim 1, wherein the injection means define a plurality of injection orifices oriented in the upstream direction.

3. The manifold as claimed in claim 1, wherein the direction of injection of the flow of recirculated exhaust gases and the direction of circulation of the flow of intake gas forming an injection angle that is less than 30°.

4. The manifold as claimed in claim 1, wherein the injection means are formed at the downstream end of the manifold.

5. The manifold as claimed in claim 1, wherein the manifold housing comprises a rectangular section for passage of the flow of intake gas, and the injection means open onto at least one length of the manifold housing.

6. The manifold as claimed in claim 5, wherein the injection means open onto at least two adjacent sides of the manifold housing.

7. The manifold as claimed in claim 5, wherein the injection means are formed in the manifold housing.

8. The manifold as claimed in claim 7, wherein the manifold housing comprises walls for guiding the intake flow, and the injection means are formed at a distance from said walls.

9. The manifold as claimed in claim 1, wherein the heat exchanger comprises a gas cooling heat exchange bundle.

* * * * *